May 16, 1939.  F. D. WENN  2,158,263
SAFETY EMERGENCY BRAKE LEVER
Filed May 28, 1937  2 Sheets-Sheet 2
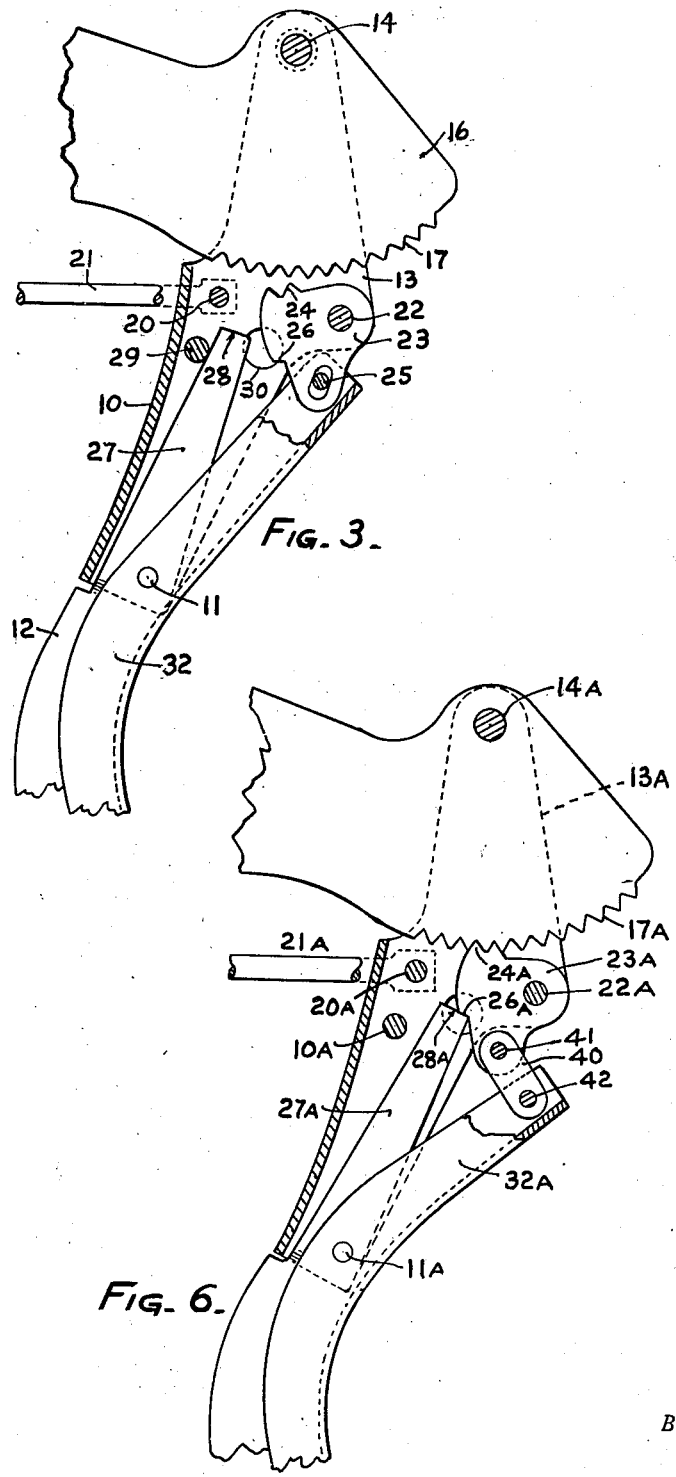
Fig. 3.
Fig. 6.
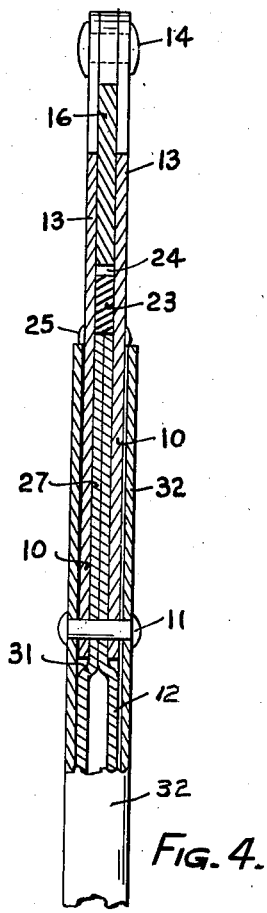
Fig. 4.
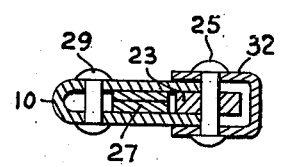
Fig. 5.
FLOYD D. WENN
INVENTOR.
BY Louis Illmer
ATTORNEY.

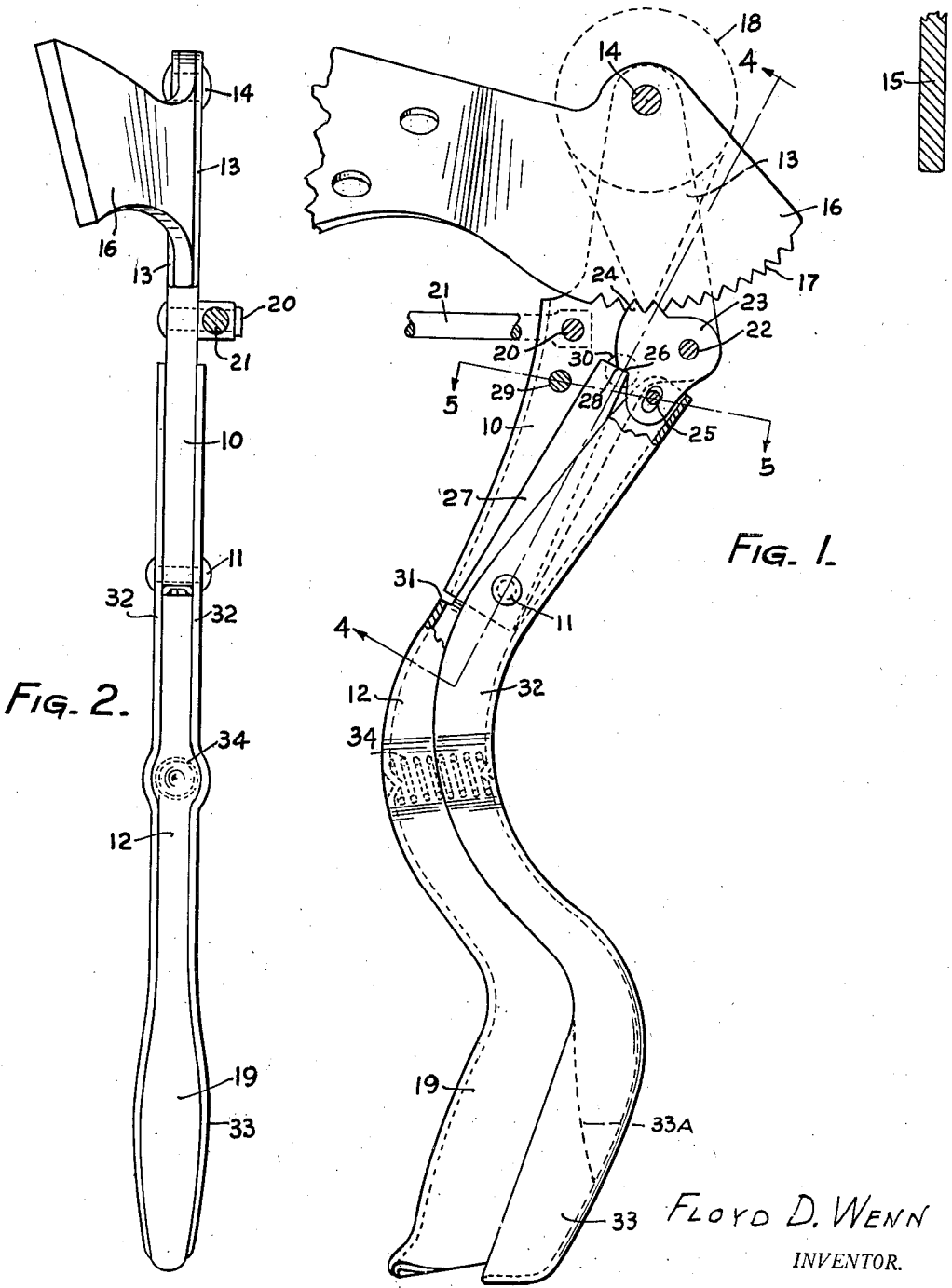

Patented May 16, 1939

2,158,263

UNITED STATES PATENT OFFICE 2,158,263

SAFETY EMERGENCY BRAKE LEVER

Floyd D. Wenn, Binghamton, N. Y., assignor to The Brewer-Titchener Corporation, Cortland, N. Y., a corporation of New York Application May 28, 1937, Serial No. 145,209

10 Claims. (Cl. 74—537)

This invention relates to certain novel structural improvements and more particularly pertains to a simple and compactly assembled emergency lever or the like hand control for automotive or other vehicle brakes that possesses a marked degree of safety against inadvertent pawl release of a set lever subsequent to applying its associated brake. My sectionalized brake lever is of the tripartite type of which the components may comprise a pair of pivotally connected thigh and shank sections adapted to be relatively inclined to a limited extent about a knuckle joint. A cooperating trip lever section is arranged to actuate detent means and such lever component is herein positively retained against accidental release.

The free manipulative end of the shank lever section is preferably shaped into a grippable handle portion while a remote end of the thigh lever section is mounted to turn about a main fulcrum supported by a stationary sector plate or the like rack bracket means. The arcuate edge of said sector plate may be provided with a series of ratchet teeth disposed concentrically with respect to the axis of the main fulcrum. A single pawl is pivoted to the thigh lever section and arranged to releasably engage the ratchet teeth, said detent means allowing the brake lever to be unobstructedly rocked in one direction of movement to set up the brake.

Intermediate its ends, my trip lever section may also be mounted on the aforesaid knuckle pivot. One end of such trip lever is operatively connected to actuate the pawl into its released position against spring tension. The opposite trip lever end may be extended to terminate into a spoon shaped thumb piece that is cooperatively carried alongside the handle portion of said shank lever section. A common spring suffices to return all components of my lever assembly into their respective normal positions.

Said trip lever section constitutes a lockable remote control for manipulatively releasing a one-way pawl after the draft rod has been set up into its braking position. The present design of brake lever is more especially intended for inverted pivotal suspension behind an automotive instrument board but may also be otherwise disposed. The depending lever handle is preferably located within easy reach of the driver, said handle being then raised about its main fulcrum to apply the brakes. The assembly may be so mounted that the thumb piece of my trip lever section is placed toward the driver to function in a convenient and readily understood manner. This arrangement allows the gripped lever handle to be strenuously drawn rearwardly in the direction of the driver's seat to apply such emergency brake without confusion or causing the associated thumb piece to be inadvertently manipulated by the driver while setting up the brake.

In order to release a set brake lever, a definite sequence of events is made inherent in my safety locking devices. The required inter-related movement between my several lever sections is such that its locked pawl cannot become accidentally disengaged from the sector teeth except by a deliberate successive manipulation of certain lever sections in a predetermined order. In the present lever system, the locking devices act automatically and are devoid of any extraneous lock of the conventional type that have to be key turned prior to the release of a restrained pawl.

Extended experience with remotely controlled pawls have shown the need for adequately protecting any rearwardly exposed pawl actuating lever against premature release, particularly so in the case of an automobile or truck when parked on a steep hillside in which children may be carried as front seat passengers. My several lever sections are therefore arranged to afford ample safety against being jarred or casually knocked loose while set because of some unforeseen circumstance that may result in accidental pawl displacement, which occurrence has in some instances led to disastrous consequences.

By virtue of my improvements, I am enabled to positively retain such trip lever against relative movement with respect to a pawl engaged ratchet tooth. This problem has herein been solved in a simple and effective manner without interference with any functional performances normally expected of an emergency lever, the present lever locking means being especially pertinent after the pawl or the tips of some ratchet teeth have become rounded by wear after prolonged usage.

The object of the present invention is to contrive an easily manipulated brake lever assembly of the indicated character provided with automatic safety locking means that may be compactly incorporated in automotive equipment on a low cost productive basis.

Reference is had to the accompanying two sheets of drawings which are illustrative of alternative layouts of my safety brake lever, and in which:

Fig. 1 represents an elevational side view of a brake lever assembly taken in partial section and equipped with my improved locking devices, while Fig. 2 is an edge view thereof, the pawl control being shown in locked position.

Fig. 3 is a partial view similar to Fig. 1 but depicting the pawl in its released position.

Figs. 4 and 5 respectively show a sectional view taken along lines 4—4 and 5—5 of Fig. 1.

Fig. 6 corresponds to Fig. 1 but in a fragmental view, defines a modified hook-up having a link interposed between my trip lever and the pawl actuated thereby.

Referring first in detail to the Figs. 1 to 5 disclosure, my brake lever proper is preferably of the jointed sectionalized type comprising a sheet metal primary or thigh section 10 having a channeled profile of which one section end is equipped with the knuckle pivot 11. A secondary handle lever or tubular shank section 12 may intermediate its ends be mounted upon the same pivot. The opposite end region of said thigh section may be forked as at 13 and pivotally mounted to turn around a fixed main fulcrum 14. Said fulcrum may be upheld by bracket means disposed interiorly behind the instrument board 15 of an automobile.

Such bracket may be attached to some suitable cowl fixture and equipped with a stationary sector plate 16 of which the apex region may be apertured to allow of entering the fulcrum 14 therethrough, the thigh forks 13 being preferably arranged to straddle said plate. The arcuate perimeter of such sector may be serrated to provide a series of outwardly directed, case hardened ratchet teeth 17 disposed concentrically about the fulcrum axis. For reasons that will appear presently, the opposed radial faces of each such blunt tooth may be reversely directed into tangency with a common base circle 18 as shown in Fig. 1 to permit of free pawl withdrawal without a pronounced undercut drag. Said sector plate is further kept relatively thick to afford adequate tooth width not likely to wear excessively into a rounded tip condition.

The depending sheet metal shank section 12 preferably extends rearwardly in S-shaped configuration to bring its socketed grip or handle portion 19 within convenient reach of the vehicle driver. A draft pin 20 is preferably mounted upon the thigh section 10 to actuate the brake rod 21. This slidable rod or link may drop through a small opening in the car floor in weather-sealed fashion and therebeneath be operatively connected to the brake gear.

Forwardly of the draft pin, a pawl pivot 22 bridges the side flanges of my channeled thigh section. Interposed between these flanges is a sheet metal pawl 23 whose perimeter is preferably given a substantially triangular shape. One apex region of such pawl may be apertured and mounted upon the pivot 22. Rearwardly from the last named pivot in another perimetric apex region, said pawl is provided with one or more V-shaped teeth such as 24 arranged for stepwise engagement with certain of the ratchet teeth 17. The lowermost apex region of such triangular pawl may be slotted radially toward the pivot 22 and have a pawl actuating or slip pin 25 slidably mounted therethrough. As a distinctive feature, the rearward edge face of such pawl is shown indented to provide for abutment means 26, the shoulder face of which is directed lengthwise of the several sector teeth.

The shank section 12 of my brake lever may be integrally equipped with an extension or tongue 27 that terminates in a mated toe or edge element 28 disposed to retractably interlock with the abutment element 26 in the Fig. 1 manner after the pawl has fully engaged a sector tooth. A stop pin 29 restricts the withdrawal of said toe edge upon clearing the abutment 26. A peep hole 30 may be cut through one side flange of the thigh section 10 in order to visualize the prevailing position of the otherwise concealed toe edge. It will be observed that such channeled thigh section telescopically embraces the shank extension 27 therein and the root of which extension may be suitably inset at 31 to constitute a reenforced laminated tongue element that affords a compact lever assembly having a neat trim in its knuckle jointed region.

To complete my assembly, a trip lever section 32 may be tiltably mounted intermediate its ends upon the knuckle pivot 11 or any other equivalent support. This cross-sectionally channeled trip lever may be given a crooked contour conforming to that of the shank section 12. The side flanges of the latter may be reversely directed and preferably nested within the confines of the trip lever flanges as shown. One end of the last named lever may comprise a manipulative spoon-like or other chambered thumb piece 33 that is cooperatively brought alongside the grip handle 19; if preferred, the extremity of such piece may be cut away along the dotted line 33A of Fig. 1.

The trip lever end that lies remote from its thumb piece may be apertured to receive the pawl actuating pin 25 therethrough. Adjacent to the knuckle pivot 11, the nested channeled lever portions 12 and 32 may be interiorly enlarged or otherwise socketed to mount a coiled or the like spring 34 therein, which resilient means serves to thrust apart the retractible grip 19 and the thumb piece 33 into a normally spaced relationship.

Assuming the working parts to be assembled as described, the intended mode of operation may be traced as follows:

When the brake is set, the pawl teeth 24 are thrown into full mesh with certain of the sector teeth 17 so as to retain the set brake rod 21 under tension. At the same time, the interlocking toe edge 28 will under the action of the spring 34, fall into operative engagement with the abutment 26 and thereby positively retain the trip lever 32 against tilting about its fulcrum 11 or permit of any other manipulative movement. As was previously pointed out, the principal aim of the present invention is to prevent inadvertent release of a set brake rod. This end is herein accomplished because the pawl 23 of Fig. 1 cannot be moved out of meshed engagement with the sector teeth 17 while the toe 27 remains locked behind my pawl abutment. As a consequence, the trip lever 32 together with its thumb piece 33, is rigidly retained relative to the sector teeth and the trip lever of itself is rendered incapable of releasing the locked pawl.

It is only by deliberately grasping the protected lever handle 19 that a release of a locked brake setting can be effected. By first squeezing said handle rearwardly and toward the now rigidly held, manipulative trip lever end, the toe edge 28 will thereby be withdrawn toward the stop pin 29, which in turn releases the trip lever and leaves the pawl free to rotate about its pivot 22. A further squeezing together of the thumb piece 33 toward the then stopped handle 19, allows the manipulative end of the trip lever to move forwardly away from the driver to cause the slip pin 25 to disengage the meshed teeth 17 and 24, whereupon the pawl may assume its Fig. 3 position and thereby release a previously set brake rod.

Assuming the thigh lever section to stand forwardly in its slackened brake position, the driver merely grips the handle 19 and drags the same rearwardly until the brake rod 21 has been sufficiently tensioned and the pawl allowed to drop stepwise into a corresponding sector tooth. Upon liberating the handle grip, the return spring 34 thrusts the toe 28 into operative engagement with the pawl abutment 26 and thereby automatically locks the trip lever against unintentional pawl release.

In this connection, attention is directed to the stipulated sector tooth formation. Not only may the tooth tips be kept comparatively blunt and devoid of sharp undercut radial faces, but the Fig. 1 layout thereof is such that the pawl teeth 24 may be freely released without requiring the brake lever to additionally tension the draft rod 21, this aspect being particularly pertinent for women drivers. The use of such blunt teeth is herein permissible because the toe lock 28 is capable of effectively retaining a set brake, although the engaged teeth may have become appreciably rounded from wear under arduous service conditions.

That my locking instrumentalities are applicable to other styles of brake levers is made evident by reference to Fig. 6. This disclosure generally follows the Fig. 1 assembly except that the pawl is differently linked to the trip lever, without however materially altering the characteristic sequence of events required to release a locked pawl. In Fig. 6, lever elements that correspond to the Fig. 1 assembly are similarly designated and identified by the subscripts "A".

As an equivalent of a slotted pawl and associated slip pin 25 of Fig. 1, one or more tie straps such as 40 may serve to operatively interconnect the pawl 23A to the contiguous end of the trip lever 32A through the complementary strap pivots 41 and 42. While the link strap 40 is here subjected to tension in releasing said pawl, reversed thrust straps may be similarly incorporated to produce a like result. My invention further contemplates actuating such pawl by any suitable means, also to make equivalent substitutions for the abutment 26, dependent upon the type of pawl that may be utilized.

It will be obvious that my several levers need not necessarily be stamped up from sheet metal since the parts thereof may be solid forged, also that the ratchet teeth may in certain instances be disposed on the far side of the main lever fulcrum, or if preferred, a toothless frictional type of one-way clutch may be substituted for the conventional ratchet pawl. As will be understood by those skilled in this art, the disclosed improvements also find application to other than emergency brake lever uses and that various structural changes in the details and disposition thereof may be resorted to in likewise carrying out my illustrative embodiment, all without departing from the spirit and scope of my invention heretofore described and more particularly pointed out in the appended claims.

I claim:

1. A safety brake lever comprising a thigh section having one end region pivotally mounted to rock about a main fulcrum and which lever further comprises a shank section that is pivoted by a knuckle joint to the opposite end region of said thigh section and providing for a length portion that extends radially outward from such joint, sector plate means, clutch means carried by the thigh section and serving to releasably grip the sector plate means, manipulative trip lever means pivoted intermediate its ends to the aforesaid brake lever and having one such end operatively connected to release the grip of said clutch means, and automatic retaining means actuated in unison with the shank section serving to positively lock the trip lever means against manipulative movement when the clutch grippingly engages the sector plate means.

2. A safety brake lever comprising a main fulcrum pivotally mounting said lever for rocking movement, stationary sector plate means including a series of ratchet teeth disposed about the axis of the main fulcrum, a single pawl carried by the brake lever for stepwise engagement with said teeth, manipulative trip lever means pivoted to the brake lever to rock thereon and operatively connected to said pawl to release the latter when the trip lever means is rocked into one of its extreme positions, and retaining means automatically locking the trip lever when rocked into its opposite extreme position and upon bringing said pawl into engagement with a certain ratchet tooth, said trip lever while locked being positively retained against any manipulative movement.

3. The combination of a rockable safety brake lever comprising a thigh section and a manipulative shank section that are interconnected by a knuckle pivot, a main fulcrum pivotally mounting the thigh section of said lever, stationary sector plate means including a series of ratchet teeth disposed about the axis of the main fulcrum, pawl means carried by said lever for stepwise engagement with said teeth, a manipulative trip lever pivoted to the brake lever to rock thereon and operatively connected to said pawl means to release the latter when said trip lever is rocked into one of its extreme positions, and means for automatically locking said trip lever in the other of its extreme positions subsequent to bringing said pawl into engagement with a certain tooth, said trip lever being positively retained against all manipulative movement while locked.

4. An emergency brake actuating assembly comprising a thigh lever section and a manipulative shank lever section that are interconnected by a knuckle pivot and which shank section is equipped with toe means, a main fulcrum for the thigh section, stationary sector plate means having a series of ratchet teeth disposed about the axis of the main fulcrum, pawl means mounted on the thigh section for stepwise engagement with the ratchet teeth, said pawl means including abutment means that positively interlocks with the aforesaid toe means whenever said pawl fully engages any one such tooth and the lever sections assume a certain relative inclination about their knuckle pivot, and trip lever means rotatably mounted on said knuckle pivot and operatively connected with the pawl means, said trip lever means serving to release pawl engagement upon shifting the lever sections into a different inclination.

5. In a tripartite brake lever comprising a thigh section mounted to rock about a main fulcrum, a trip lever section that intermediate its ends is pivotally carried by said brake lever with one such end region directed radially outward from the fulcrum axis to terminate in a manipulative thumb piece, a shank section equipped with an interlocking element, said shank section being pivoted to the thigh section and shaped to provide for a manipulative handle disposed in cooperative adjacency with said thumb piece, resilient means normally urging the thumb piece away from its associated handle, stationary sector plate means, one-way clutch means mounted on the thigh section and serving to releasably grip the sector plate means, said clutch means including abutment means that automatically coacts with the interlocking element when the clutch means grips said plate means, and means operatively interconnecting the other end region of the trip lever with the clutch means whereby to release the last named means, the trip lever being positively retained against manipulation about the pivot thereof while said elements remain interlocked.

6. In a tripartite brake lever for automotive emergency purposes, said lever comprising a thigh section mounted to rock about a main fulcrum toward or away from the driver's seat, a trip lever section that intermediate its ends is pivotally carried by the brake lever and having one end directed radially outward from the fulcrum axis to provide for a manipulative thumb piece located forwardly of said seat, a shank section equipped with an interlocking element, said shank section being pivoted to the thigh section by a knuckle joint and shaped to provide for a manipulative handle portion located in cooperative adjacency and rearwardly of said thumb piece, resilient means urging the thumb piece away from its associated handle, stationary sector plate means provided with a series of ratchet teeth disposed about the aforesaid axis, pawl means pivoted to the thigh section for stepwise engagement with the ratchet teeth, said pawl means including abutment means that automatically coacts with the interlocking element whenever said pawl fully engages any one such tooth and the thigh and shank sections assume a certain relative inclination, and means operatively interconnecting the other end region of the trip lever section with the pawl means, the last named means being positively retained against tooth disengagement by said interlocked elements and releasable only by deliberately manipulating the shank section into a different inclination with respect to the thigh section.

7. In a tripartite brake lever for automotive emergency purposes, said lever comprising a thigh section pivotally suspended upon a main fulcrum to rock toward or away from the driver's seat, a trip lever section that intermediate its ends is pivotally carried by the brake lever and having one end region directed radially downward from the fulcrum axis to provide for a depending manipulative thumb piece, a shank section equipped with an interlocking element, said shank section being pivoted to the thigh section by a knuckle joint and shaped to provide for a manipulative handle located in cooperative adjacency and rearwardly behind said thumb piece, resilient means urging the thumb piece away from its associated handle, stationary sector plate means provided with a series of ratchet teeth disposed about the aforesaid axis, pawl means pivoted to the thigh section for stepwise engagement with the ratchet teeth, said pawl means including abutment means that automatically coacts with the interlocking element whenever said pawl fully engages any one such tooth, and means operatively interconnecting the opposite end region of the trip lever section with the tooth engaged pawl means, the release of said pawl means being effected by deliberately pressing the handle of the shank section toward the thumb piece while the latter is fixedly retained against movement about its pivot, whereby in sequence first to retract the interlocking element with respect to the abutment means and thereupon allowing the pawl means to be unobstructedly actuated out of engagement with said one tooth.

8. In a tripartite brake lever comprising a thigh section mounted to rock about a main fulcrum, a trip lever section that intermediate its ends is pivotally carried by the brake lever, a shank section pivotally mounted on the thigh section and equipped with an interlocking element, stationary sector plate means provided with a series of non-undercut blunted ratchet teeth disposed about the fulcrum axis, pawl means pivoted to the thigh section for stepwise engagement with said ratchet teeth, said pawl means including abutment means that automatically coacts with the interlocking element whenever said pawl engages a certain tooth in set up brake position, and means operatively interconnecting an adjacent end of the trip lever section with the pawl means, the last named means in the aforesaid set position being positively retained against tooth disengagement by said interlocking elements and which elements are releasable without increasingly setting up said brake.

9. In an emergency brake lever comprising a cross-sectionally channeled thigh section having one end region mounted to rock about a main fulcrum, a shank section that intermediate its ends is pivotally adjoined to the thigh section with one such end region telescoped within the last named section and terminating in a toe element, stationary sector plate means including a series of ratchet teeth disposed about the axis of the main fulcrum, pawl means pivotally mounted on the thigh section for stepwise engagement with the ratchet teeth, said pawl means including abutment means that interlocks with the toe element when the jointed sections assume a certain relative inclination about the shank pivot, and an exteriorly disposed trip lever having a channeled transverse profile of which the side flanges embrace therebetween the opposite end region of the thigh section, said flanges intermediate their respective ends being pivotally adjoined to one of said sections and having corresponding flange ends operatively connected to said pawl means.

10. In a tripartite brake lever comprising a thigh section mounted to rock about a main fulcrum, a shank section pivotally adjoined on the thigh section and equipped with an interlocking toe element, stationary sector plate means provided with a series of ratchet teeth disposed about the axis of the main fulcrum, a relatively flat pawl of triangular perimetric shape, one apex region thereof being apertured and pivotally mounted on the thigh section with another apex region provided with serrated means for stepwise engagement with the ratchet teeth, the perimeter of said pawl being indented to provide for abutment means disposed to interlock with said toe element when the thigh and shank sections are brought into a certain relative inclination, and a trip lever section pivotally carried by the brake lever with one trip lever end region operatively connected to the remaining apex region of the aforesaid pawl shape.

FLOYD D. WENN.